(12) United States Patent
Hattori

(10) Patent No.: US 10,807,831 B2
(45) Date of Patent: Oct. 20, 2020

(54) ELEVATOR SYSTEM

(71) Applicant: Mitsubishi Electric Corporation, Chiyoda-ku (JP)

(72) Inventor: Tomohiro Hattori, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 263 days.

(21) Appl. No.: 15/779,586

(22) PCT Filed: Mar. 14, 2016

(86) PCT No.: PCT/JP2016/057979
§ 371 (c)(1),
(2) Date: May 29, 2018

(87) PCT Pub. No.: WO2017/158683
PCT Pub. Date: Sep. 21, 2017

(65) Prior Publication Data
US 2020/0299100 A1 Sep. 24, 2020

(51) Int. Cl.
*H04M 11/04* (2006.01)
*B66B 1/34* (2006.01)
(Continued)

(52) U.S. Cl.
CPC .............. *B66B 1/3461* (2013.01); *B66B 3/00* (2013.01); *B66B 5/0018* (2013.01);
(Continued)

(58) Field of Classification Search
None
See application file for complete search history.

(56) References Cited

U.S. PATENT DOCUMENTS 5,736,694 A * 4/1998 Ketoviita .............. B66B 5/0006
187/247
9,969,597 B2 * 5/2018 Beloin .................. B66B 1/3461
(Continued)

FOREIGN PATENT DOCUMENTS

JP 5-167706 A 7/1993
JP 2001-257797 A 9/2001
(Continued)

OTHER PUBLICATIONS

International Search Report dated Jun. 7, 2016 in PCT/JP2016/057979, filed on Mar. 14, 2016.
(Continued)

*Primary Examiner* — Quoc D Tran
(74) *Attorney, Agent, or Firm* — Oblon, McClelland, Maier & Neustadt, L.L.P.

(57) ABSTRACT

An elevator system is provided, in which when a telephone in an information center receives an emergency call using an analogue public telephone network from an interphone of an elevator, a monitoring person in the information center can confirm information of the elevator which transmits the emergency call while responding to the emergency call by the telephone. To this end, the elevator system includes: means configured to add, as an identification voice signal, identification information to a call voice signal input to an intercom provided inside each of cars of elevators, the identification information enabling the elevator in which the intercom is installed to be specified; means configured to transmit, with an analog signal, the call voice signal to which the identification voice signal is added; means configured to reproduce the call voice signal included in the transmitted analog signal; means configured to extract the identification information from the identification voice signal included in the transmitted analog signal; and a monitoring terminal configured to acquire, from a server configured to store
(Continued)

information on the elevator specified by the identification information in association with the identification information, information on the elevator associated with the identification information extracted from the identification voice signal and to display the acquired information.

5 Claims, 8 Drawing Sheets

(51) Int. Cl.
*B66B 5/00* (2006.01)
*B66B 3/00* (2006.01)
*H04M 3/42* (2006.01)
*H04M 11/02* (2006.01)
*H04M 3/51* (2006.01)
*H04Q 1/45* (2006.01)

(52) U.S. Cl.
CPC ... *H04M 3/42042* (2013.01); *H04M 3/42357* (2013.01); *H04M 3/5116* (2013.01); *H04M 11/025* (2013.01); *H04M 2203/2016* (2013.01); *H04M 2242/04* (2013.01); *H04Q 1/45* (2013.01); *H04Q 2213/13405* (2013.01)

(56) References Cited

U.S. PATENT DOCUMENTS

| | | | |
|---|---|---|---|
| 2003/0227540 A1* | 12/2003 | Monroe | G08B 13/19684 348/14.02 |
| 2013/0272506 A1* | 10/2013 | Rytila | H04W 76/50 379/27.02 |
| 2018/0237258 A1* | 8/2018 | Herkel | B66B 1/3446 |
| 2018/0370759 A1* | 12/2018 | Hattori | B66B 3/00 |

FOREIGN PATENT DOCUMENTS

| | | |
|---|---|---|
| JP | 2003-300679 A | 10/2003 |
| JP | 2004-161458 A | 6/2004 |
| JP | 2007-124154 A | 5/2007 |
| JP | 2007-161463 A | 6/2007 |
| JP | 2015-013730 A | 1/2015 |
| KR | 10-1293322 B1 | 7/2013 |

OTHER PUBLICATIONS

Office Action dated Jun. 27, 2019 in Korean Patent Application No. 10-2018-7021214, citing documents AO and AP therein, 14 pages (with English translation).

* cited by examiner

112: INFORMATION COLLECTION DEVICE
114: INTERCOM CONTROL UNIT
115: ELEVATOR INFORMATION COLLECTING UNIT

130: BUILDING-SIDE SORTING DEVICE
131: CALL CONTROL UNIT
132: ANALOG COMMUNICATION CONTROL UNIT
133: DIGITAL COMMUNICATION CONTROL UNIT
134: MODE SWITCHING UNIT

240: SORTING/CONVERTING DEVICE
241: ELEVATOR INFORMATION RECEIVING UNIT
242: ID EXTRACTING UNIT
243: VOICE CONVERTING UNIT

220: SERVER
221  STORAGE UNIT
222: SERVER CONTROL UNIT

250: ANALYZER
251: ID EXTRACTING/CONVERTING UNIT
252: VOICE TRANSMITTING UNIT

210: MONITORING TERMINAL
211: DISPLAY UNIT
212: INPUT UNIT
213: INFORMATION ACQUIRING UNIT

FIG. 12

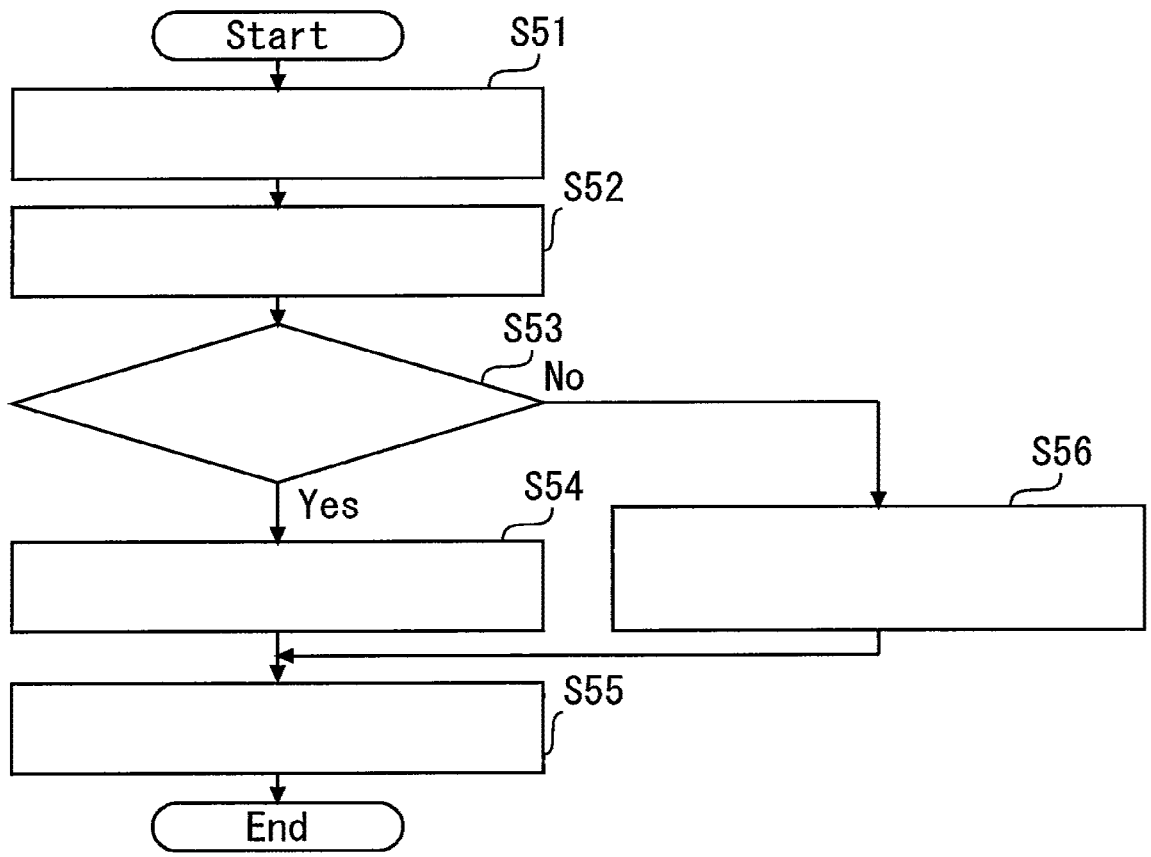

S51: RECEIVE EMERGENCY CALL (IP NETWORK)
S52: RETRIEVE IDENTIFICATION INFORMATION FROM PACKET INFORMATION
S53: IDENTIFICATION INFORMATION EXTRACTED?
S54: DISPLAY ELEVATOR INFORMATION ON MONITORING TERMINAL VIA SERVER
S55: CONVERT VOICE DATA (VoIP) INTO ANALOG VOICE
     AND SUPPLY TO TELEPHONE
S56: DISPLAY ON-CALL STATE (STATE OTHER THAN EMERGENCY CALL
     FROM ELEVATOR) ON MONITORING TERMINAL

ELEVATOR SYSTEM

TECHNICAL FIELD

The present invention relates to an elevator system.

BACKGROUND ART

Conventionally, an elevator system is known which is constituted by an elevator monitoring device which monitors a state of an elevator and which transmits anomaly information when detecting an anomaly, a monitoring center (an information center) which remotely monitors states of elevators in a centralized manner, a data receiving device which is provided in the monitoring center, and a line which connects the elevator monitoring device and the data receiving device with each other, wherein a telephone is provided at the monitoring center, and the elevator monitoring device synthesizes a voice sentence with respect to an anomaly of the elevator and which transmits the voice sentence to the telephone (for example, refer to PTL 1).

CITATION LIST

Patent Literature

[PTL 1] Japanese Patent Application Laid-open No. 2007-161463

SUMMARY OF INVENTION

Technical Problem

However, in the conventional elevator system described in PTL 1, since a voice sentence with respect to an anomaly of an elevator is received by a telephone, information on the anomaly of the elevator and the like cannot be confirmed during an emergency call with an intercom inside a car of the elevator.

The present invention has been made in order to solve such problems, and an object thereof is to provide an elevator system which is capable of, when a telephone at an information center receives an emergency call using an analog public telephone network from an intercom inside a car of an elevator, identifying a car number of the elevator having made the emergency call and, while having an observer at the information center answer the emergency call on the telephone, simultaneously confirming information on the elevator having made the emergency call.

Solution to Problem

An elevator system according to the present invention includes: an intercom provided inside each of cars of a plurality of elevators; identification information adding means configured to add, as an identification voice signal, identification information to a call voice signal input to the intercom, the identification information enabling the elevator in which the intercom is installed to be specified; analog transmitting means configured to transmit, with an analog signal, the call voice signal to which the identification voice signal is added by the identification information adding means; reproducing means configured to reproduce the call voice signal included in the analog signal transmitted by the analog transmitting means; identification information extracting means configured to extract the identification information from the identification voice signal included in the analog signal transmitted by the analog transmitting means; and a monitoring terminal configured to acquire, from a server configured to store information on the elevator specified by the identification information in association with the identification information, information on the elevator associated with the identification information extracted by the identification information extracting means and to display the acquired information.

Advantageous Effects of Invention

The elevator system according to the present invention produces an advantageous effect of being capable of, when a telephone at an information center receives an emergency call using an analog public telephone network from an intercom inside a car of an elevator, identifying a car number of the elevator having made the emergency call and, while having an observer at the information center answer the emergency call on the telephone, simultaneously confirming information on the elevator having made the emergency call.

BRIEF DESCRIPTION OF THE DRAWINGS

FIG. 12 is a flow chart showing operations of the sorting/converting device when an emergency call is received, which is provided in the elevator system related to the first embodiment of the present invention.

DESCRIPTION OF EMBODIMENTS

Embodiments of the present invention will now be described with reference to the accompanying drawings. In the respective drawings, same or comparable portions will be denoted by same reference signs and overlapping descriptions will be simplified or omitted as deemed appropriate. It should be noted that the present invention is not limited to the embodiments described below and various modifications can be made thereto without departing from the spirit of the present invention.

First Embodiment

Figure 1:
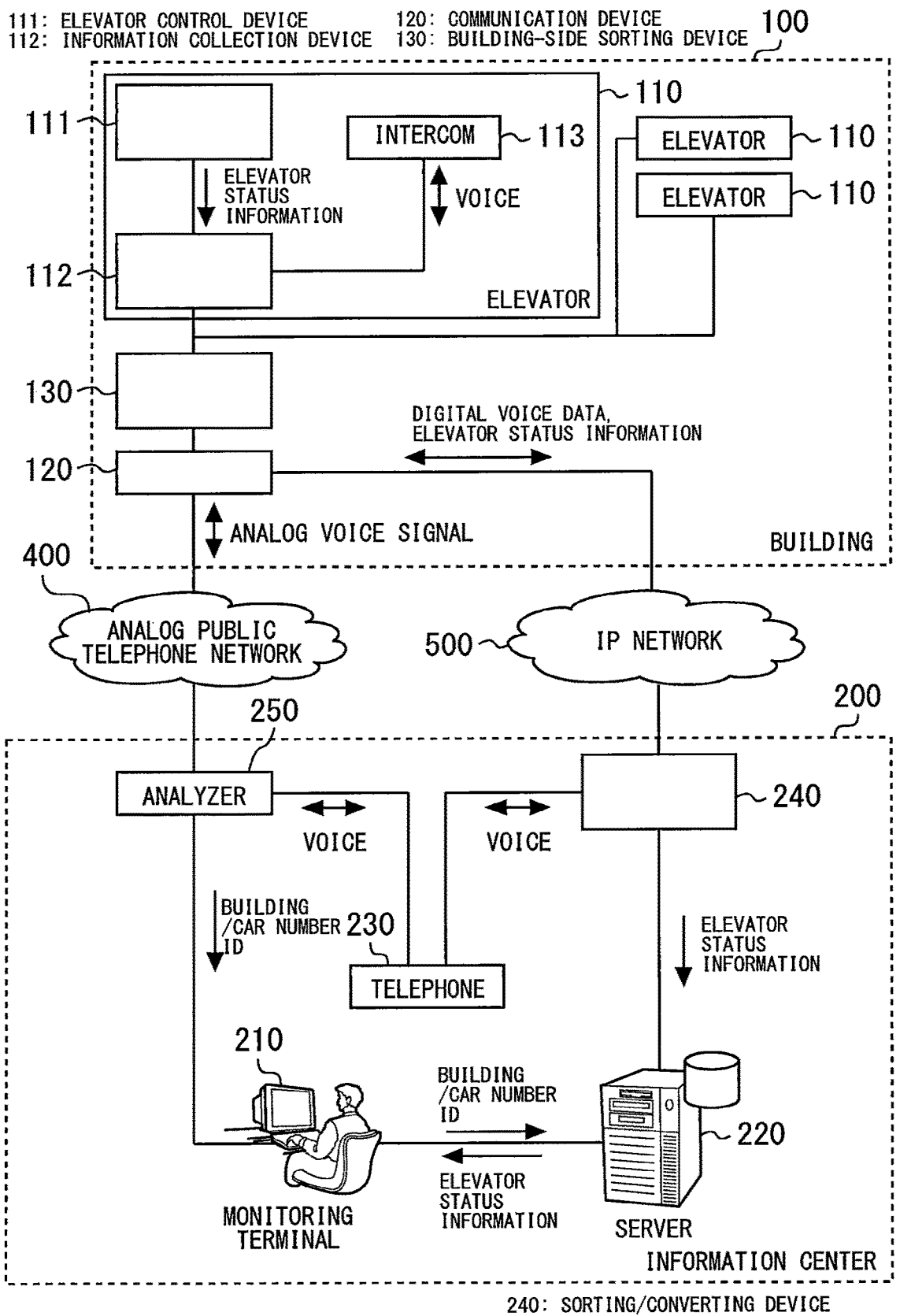
FIG. 1 is a diagram illustrating an overall configuration of an elevator system related to the first embodiment of the present invention.
Figure 2:
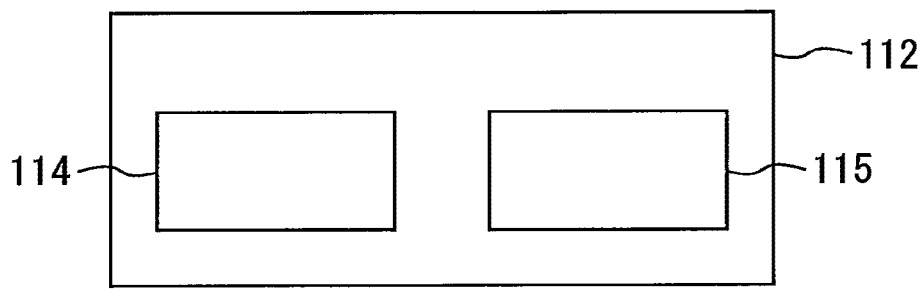
FIG. 2 is a block diagram showing a configuration of an information collection device provided in the elevator system related to the first embodiment of the present invention.
Figure 3:
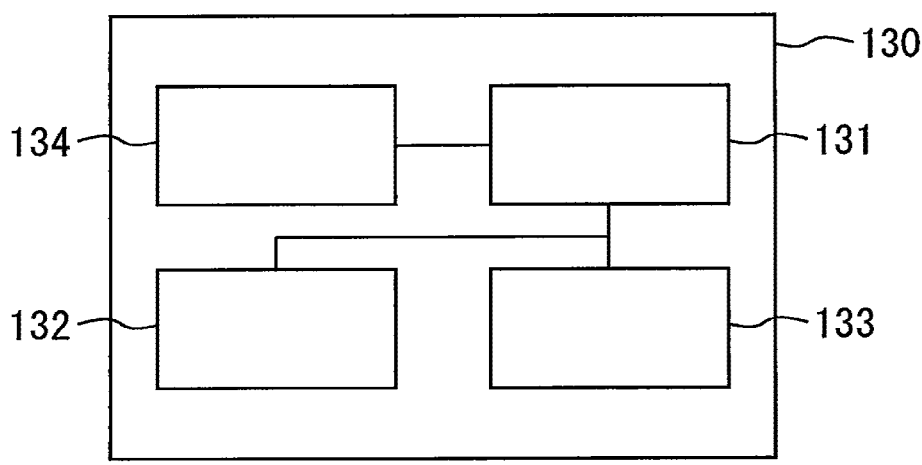
FIG. 3 is a block diagram showing a configuration of a building-side sorting device provided in the elevator system related to the first embodiment of the present invention.
Figure 4:
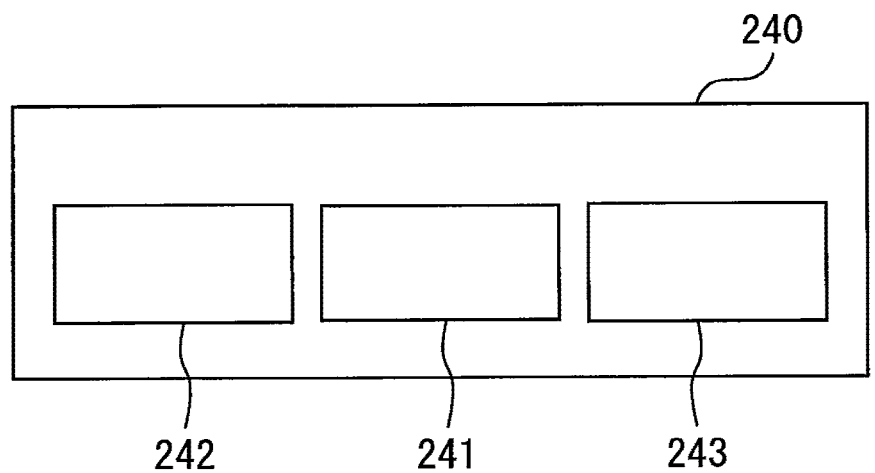
FIG. 4 is a block diagram showing a configuration of a sorting/converting device provided in the elevator system related to the first embodiment of the present invention.
Figure 5:
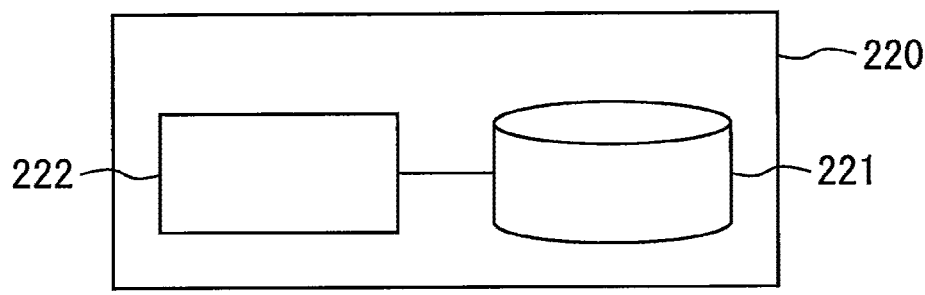
FIG. 5 is a block diagram showing a configuration of a server provided in the elevator system related to the first embodiment of the present invention.
Figure 6:
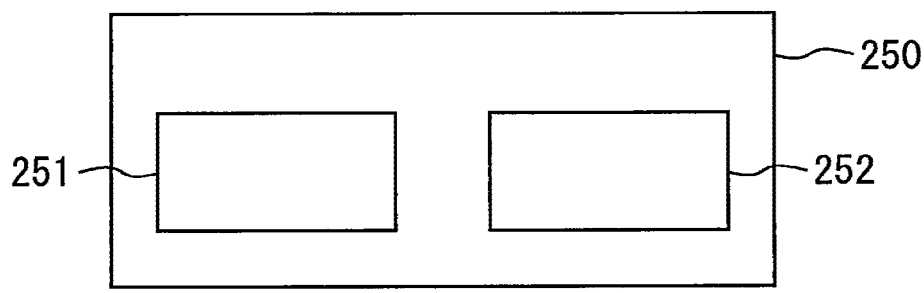
FIG. 6 is a block diagram showing a configuration of an analyzer provided in the elevator system related to the first embodiment of the present invention.
Figure 7:
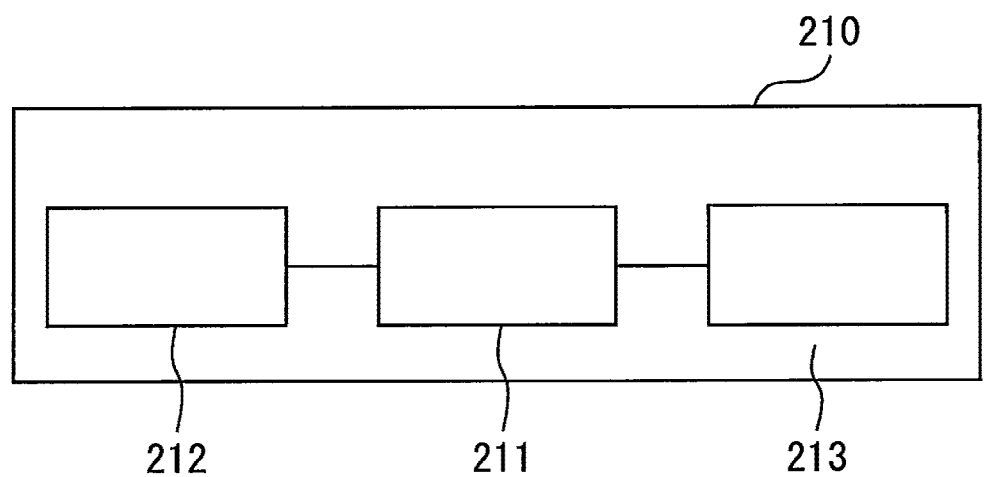
FIG. 7 is a block diagram showing a configuration of a monitoring terminal provided in the elevator system related to the first embodiment of the present invention.
Figure 8:
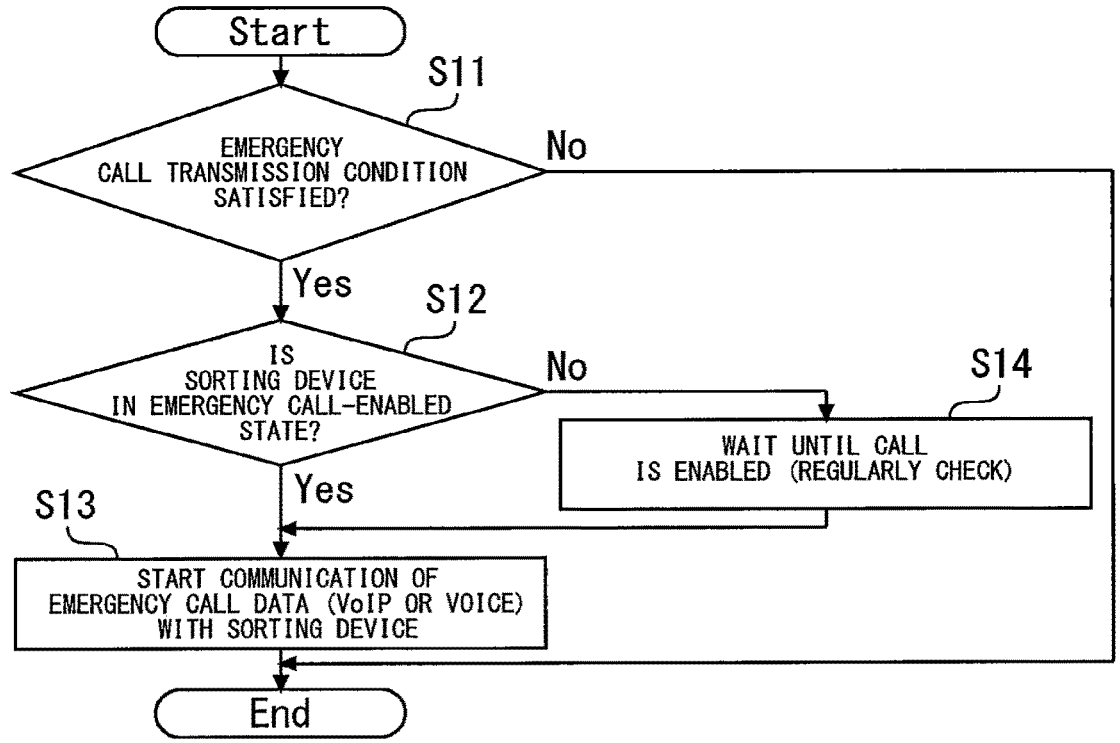
FIG. 8 is a flow chart showing operations of the information collection device when an emergency call is made, which is provided in the elevator system related to the first embodiment of the present invention.
Figure 9:
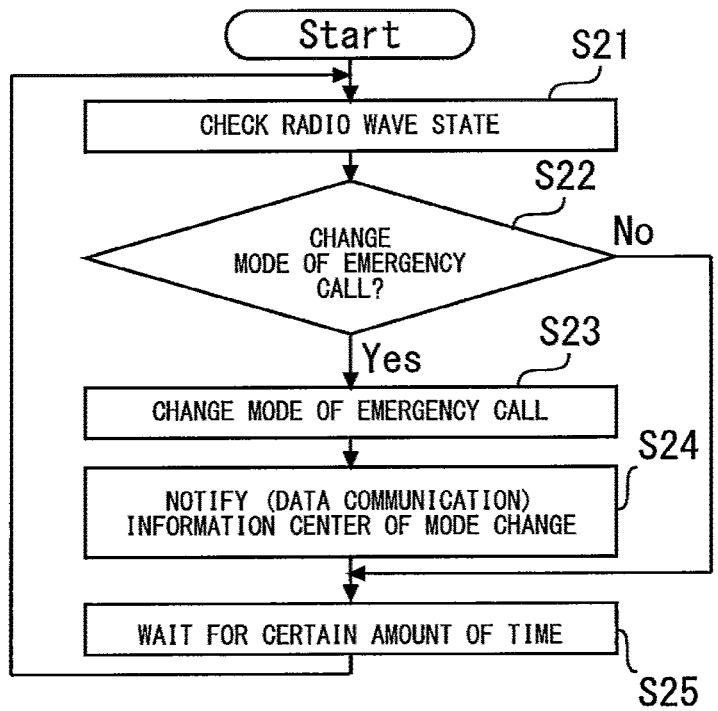
FIG. 9 is a flow chart showing operations of the building-side sorting device when switching emergency call modes, which is provided in the elevator system related to the first embodiment of the present invention.
Figure 10:
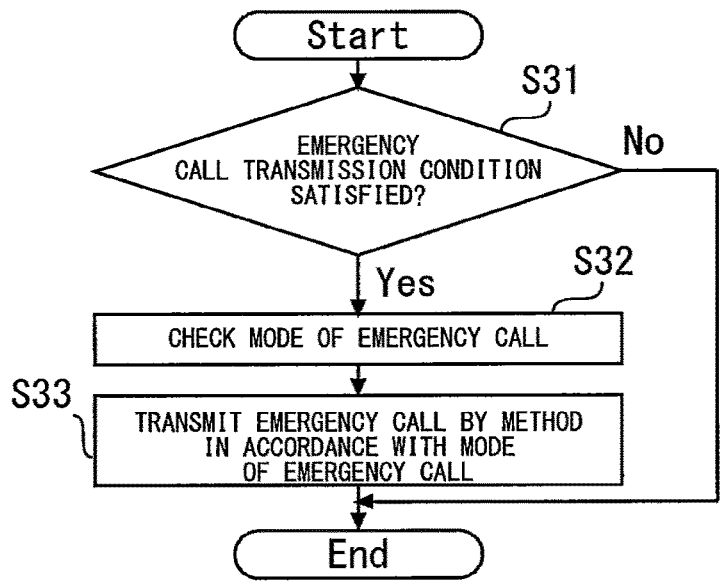
FIG. 10 is a flow chart showing operations of the building-side sorting device when an emergency call is made, which is provided in the elevator system related to the first embodiment of the present invention.
Figure 11:
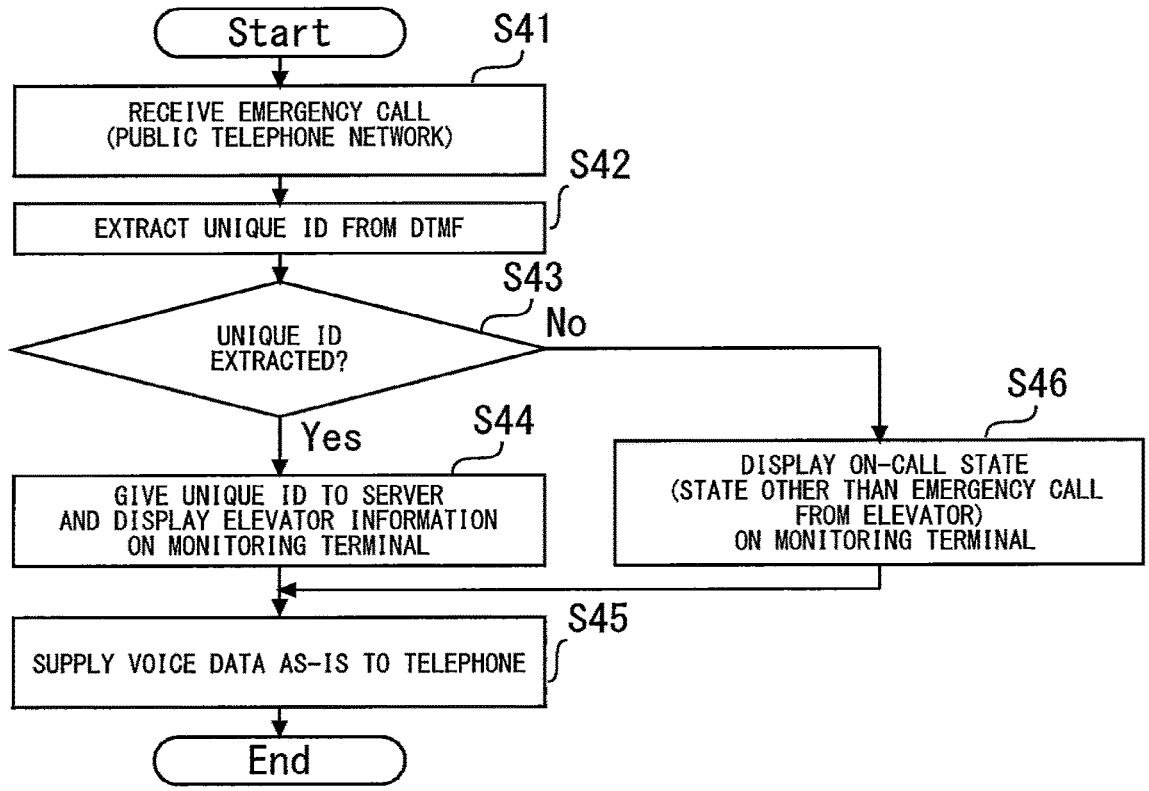
FIG. 11 is a flow chart showing operations of the analyzer when an emergency call is received, which is provided in the elevator system related to the first embodiment of the present invention.

FIGS. 1 to 12 are related to a first embodiment of the present invention, in which: FIG. 1 is a diagram illustrating an overall configuration of an elevator system; FIG. 2 is a block diagram showing a configuration of an information collection device provided in the elevator system; FIG. 3 is a block diagram showing a configuration of a building-side sorting device provided in the elevator system; FIG. 4 is a block diagram showing a configuration of a sorting/converting device provided in the elevator system; FIG. 5 is a block diagram showing a configuration of a server provided in the elevator system; FIG. 6 is a block diagram showing a configuration of an analyzer provided in the elevator system; FIG. 7 is a block diagram showing a configuration of a monitoring terminal provided in the elevator system; FIG. 8 is a flow chart showing operations of the information collection device when an emergency call is made; FIG. 9 is a flow chart showing operations of the building-side sorting device when switching emergency call modes; FIG. 10 is a flow chart showing operations of the building-side sorting device when an emergency call is made; FIG. 11 is a flow chart showing operations of the analyzer when an emergency call is received; and FIG. 12 is a flow chart showing operations of the sorting/converting device when an emergency call is received.

As shown in FIG. 1, the elevator system according to the first embodiment of the present invention is provided with an elevator 110 installed in a building 100. In addition, the elevator system enables calls to be made between inside of an elevator 110 installed in the building 100 and a remote location. A plurality of elevators 110 or, in this case, for example, three elevators 110 are installed in the building 100.

Each elevator 110 is provided with an elevator control device 111, an information collection device 112, and an intercom 113. The elevator control device 111 controls operations of the elevator 110. When controlling operations of an elevator 110, the elevator control device 111 uses information related to a state of the elevator 110. Specifically, for example, information related to the state of an elevator 110 includes whether the elevator 110 is moving or whether the elevator 110 has stopped, a position, a direction of operation, and a status of registration of the elevator 110, and the presence or absence of an anomaly of the elevator 110 and, (when there is an anomaly), contents or the like of the anomaly.

The information collection device 112 is connected to the elevator control device 111 and the intercom 113. As shown in FIG. 2, the information collection device 112 is provided with an intercom control unit 114 and an elevator information collecting unit 115. The elevator information collecting unit 115 of the information collection device 112 is information collecting means which collects information on an elevator 110 from the elevator control device 111.

The information on an elevator 110 collected by the elevator information collecting unit 115 includes information related to a state of an elevator 110 described above. In addition, the information on an elevator 110 collected by the elevator information collecting unit 115 also includes car number information of the elevator 110. Car number information of an elevator 110 refers to information which enables the elevator 110 to be uniquely identified among a plurality of elevators 110 installed in the building 100. Specifically, for example, a serial number assigned to each elevator 110 in each building 100 or the like can be used as the car number information of the elevator 110.

For example, the information on an elevator 110 collected by the elevator information collecting unit 115 of the information collection device 112 is temporarily stored in a storage device (not shown) or the like provided in the information collection device 112. Moreover, FIG. 1 exemplifies a case where the information collection device 112 is provided in each elevator 110. However, this example is not restrictive and the information collection device 112 may be provided in each building 100 instead of in each elevator 110. In this case, the information collection device 112 may be configured to collect information on all elevators 110 installed in a building 100.

The intercom 113 is installed inside a car of each elevator 110. The intercom 113 is used by a person inside the car of an elevator 110 to call outside. To this end, each intercom 113 is provided with a microphone and a speaker (not shown). The intercom 113 is connected to the information collection device 112.

The intercom control unit 114 of the information collection device 112 controls calls made by the intercom 113 between inside and outside of the car of an elevator 110. When a voice of a person inside the car is input to the microphone of the intercom 113 in a calling state, the voice input to the microphone is output from the intercom 113 as a call voice signal. In addition, the call voice signal output from the intercom 113 is input to the intercom control unit 114 of the information collection device 112. Furthermore, when a call voice signal output from the intercom control unit 114 of the information collection device 112 is input to the intercom 113 in a calling state, the call voice signal is output from the speaker of the intercom 113 as a voice.

The building 100 in which an elevator 110 is installed is connected to an information center 200 so that the building 100 and the information center 200 are mutually communicable. Specifically, the building 100 and the information center 200 are respectively communicably connected by an analog public telephone network 400 and an IP network 500. The IP network 500 is a communication network using IP (Internet Protocol) as a communication protocol. Data communicated using a first IP network 501 is basically digital data.

The analog public telephone network 400 is a communication network including a land line network and a mobile communication network for PHS (Personal Handy-phone System), mobile phones, and the like. Data communicated using the analog public telephone network 400 is basically analog data.

Communication between the building 100 and the information center 200 using the analog public telephone network 400 and communication between the building 100 and the information center 200 using the IP network 500 can be performed mutually independently without one affecting the other. In other words, the building 100 and the information center 200 are respectively connected by the analog public telephone network 400 and the IP network 500 so as to be separately communicable.

A communication device 120 is provided in the building 100. The communication device 120 is a communication interface used by the building 100 to communicate with the information center 200 via the analog public telephone network 400 and the IP network 500. The communication device 120 is provided with a digital communication function for communicating using the IP network 500 and an analog communication function for communicating using the analog public telephone network 400.

The information center 200 shown in FIG. 1 is provided at a location which differs from the building 100 in which an elevator 110 is installed. For example, the information center 200 is installed in each region where the building 100 in which an elevator 110 is installed is located. The information center 200 monitors buildings 100 in a region for which the information center 200 is responsible. An observer, a maintenance person, and the like of elevators 110 are on duty at all times at the information center 200. In addition, in the event of an emergency such as an occurrence of an anomaly in an elevator 110 of a building 100 in the region for which the information center 200 is responsible, necessary personnel such as a maintenance person can be dispatched from the information center 200 to the building 100 in which the anomaly had occurred.

A monitoring terminal 210, a server 220, and a telephone 230 are installed in the information center 200. The monitoring terminal 210 is to be used by an observer in the information center 200 in order to monitor a state of an elevator 110 of a building 100 for which the information center 200 is responsible. The server 220 stores information on each elevator 110 installed in each building 100. The telephone 230 enables a call to be made between a person inside the car using the intercom 113 of an elevator 110 and an observer at the information center 200.

In addition, as shown in FIG. 1, a building-side sorting device 130 is provided in the building 100. As shown in FIG. 3, the building-side sorting device 130 is provided with a call control unit 131, an analog communication control unit 132, a digital communication control unit 133, and a mode switching unit 134. The call control unit 131 controls calls between the intercom 113 of an elevator 110 and the telephone 230 at the information center 200.

The analog communication control unit 132 controls the analog communication function of the communication device 120. The analog communication function of the communication device 120 and the analog communication control unit 132 of the building-side sorting device 130 constitute analog transmitting means which transmits analog signals using the analog public telephone network 400. The digital communication control unit 133 controls the digital communication function of the communication device 120. The digital communication function of the communication device 120 and the digital communication control unit 133 of the building-side sorting device 130 constitute digital transmitting means which transmits digital signals using the IP network 500.

The mode switching unit 134 is switching means for switching between transmitting a call voice signal input to the intercom 113 using the analog transmitting means and transmitting the call voice signal input to the intercom 113 using the digital transmitting means. Specifically, for example, the mode switching unit 134 normally selects a mode in which a call voice signal input to the intercom 113 is transmitted using the digital transmitting means. When a call voice signal input to the intercom 113 is transmitted using the digital transmitting means, for example, VoIP (Voice over Internet Protocol) is conceivably used.

In addition, when a call voice signal cannot be normally transmitted using the digital transmitting means such as during a failure of the IP network 500, the mode switching unit 134 switches to transmitting the call voice signal input to the intercom 113 using the analog transmitting means.

When transmitting a call voice signal with an analog signal using the analog transmitting means, the analog communication control unit 132 adds identification information which enables an elevator 110 provided with the intercom 113 to be specified to the call voice signal input to the intercom 113.

Identification information which enables an elevator 110 provided with the intercom 113 to be specified is information which enables not only a building in which the elevator 110 is installed to be specified but also a car number of the elevator 110 to be specified. As such identification information, for example, a combination of information that specifies a building 100 in which the elevator 110 is installed and information that specifies an elevator 110 installed in the building can be used. Hereinafter, such identification information will be referred to as a "building/car number ID".

Specifically, for example, a phone number assigned to the communication device 120 is conceivably used as the information that specifies the building 100 in which an elevator 110 is installed. In addition, specifically, for example, the car number described earlier is conceivably used as the information that specifies an elevator 110 installed in the building.

The analog communication control unit 132 adds a building/car number ID of an elevator 110 provided with the intercom 113 as an identification voice signal to a call voice signal input to the intercom 113. An identification voice signal is a representation by a voice signal of identification information which enables an elevator 110 provided with the intercom 113 to which a call voice signal has been input to be specified.

A case where, specifically, for example, a tone signal is used as the identification voice signal will now be described. Specifically, the analog communication control unit 132 adds a building/car number ID of an elevator 110 provided with the intercom 113 in the form of a tone signal to a call voice signal input to the intercom 113. For example, DTMF (Dual-Tone Multi-Frequency) is used to convert a building/car number ID (phone number+car number) into a tone signal.

In this manner, the analog communication control unit 132 constitutes identification information adding means which adds identification information that enables an elevator 110 provided with the intercom 113 to be specified as an identification voice signal to a call voice signal input to the intercom 113. In addition, the analog transmitting means constituted by the analog communication control unit 132 and the analog communication function transmits, with an analog signal, a call voice signal to which an identification voice signal representing a building/car number ID has been added by the identification information adding means.

Furthermore, when transmitting a call voice signal with a digital signal using the digital transmitting means, the digital communication control unit 133 generates a packet in which a header including identification information which enables an elevator 110 provided with the intercom 113 to be specified is added to the call voice signal input to the intercom 113.

In this case, each node connected to the IP network 500 can be uniquely identified by an IP address. In other words, each building 100 connected to the data center 300 can be uniquely identified using, for example, an IP address assigned to the communication device 120 of each building 100. In addition, in communication using the first IP network 501, a car number of an elevator 110 of each building 100 can be made uniquely identifiable using, for example, Network Address Translation (NAT) or IP masquerade.

In consideration thereof, the digital communication control unit 133 may generate a packet by adding a header including the IP address, the Network Address Translation, or the IP masquerade as identification information to the call voice signal. Alternatively, the digital communication control unit 133 may generate a packet by including the building/car number ID described earlier without modification as digital data in a header.

In addition, the digital transmitting means transmits information on the elevator 110 collected by the information collecting means to the server 220 of the information center 200 with a digital signal using the IP network 500. The header of each packet when transmitting the information on the elevator 110 also includes the identification information which specifies the elevator 110 related to the information.

A digital signal transmitted by the digital communication function of the communication device 120 and the digital communication control unit 133 of the building-side sorting device 130 constituting digital transmitting means using the IP network 500 is received by a sorting/converting device 240 provided at the information center 200. As shown in FIG. 4, the sorting/converting device 240 is provided with an elevator information receiving unit 241, an ID extracting unit 242, and a voice converting unit 243.

When a digital signal transmitted using the IP network 500 is information on an elevator 110, the elevator information receiving unit 241 receives the information on the elevator 110. The ID extracting unit 242 extracts the identification information or, in this case, a building/car number ID from the header included in each packet of the digital signal transmitted using the IP network 500.

Information on an elevator 110 received by the elevator information receiving unit 241 is sent to the server 220 together with the identification information (the building/car number ID) extracted by the ID extracting unit 242.

The server 220 stores the information on an elevator 110 specified by the identification information (the building/car number ID) in association with the identification information. To this end, as shown in FIG. 5, the server 220 is provided with a storage unit 221 and a server control unit 222. Information on an elevator 110 is described in the storage unit 221 in a state where the information is associated with the identification information (the building/car number ID) which specifies the elevator 110. The server control unit 222 controls processes performed by the server 220 in general.

In a case where a digital signal transmitted using the IP network 500 includes a call voice signal, the voice converting unit 243 of the sorting/converting device 240 converts the digital signal into the call voice signal. Moreover, specifically, for example, a case where a digital signal transmitted using the IP network 500 includes a call voice signal refers to a case where a voice input to the intercom 113 is transmitted from the building 100 to the information center 200 by VoIP.

The call voice signal converted by the voice converting unit 243 is sent to the telephone 230. Subsequently, the telephone 230 reproduces the call voice signal as a voice. In other words, the telephone 230 constitutes reproducing means capable of reproducing a call voice signal included in a digital signal transmitted by the digital transmitting means.

In addition, an analog signal transmitted by the analog communication function of the communication device 120 and the analog communication control unit 132 of the building-side sorting device 130 constituting analog transmitting means using the analog public telephone network 400 is received by an analyzer 250 provided at the information center 200. As shown in FIG. 6, the analyzer 250 is provided with an ID extracting/converting unit 251 and a voice transmitting unit 252.

First, the ID extracting/converting unit 251 extracts a tone signal included in an analog signal transmitted using the analog public telephone network 400. In addition, the ID extracting/converting unit 251 converts the extracted tone signal and obtains the identification information or, in this case, the building/car number ID from the tone signal. In other words, the ID extracting/converting unit 251 constitutes identification information extracting means which extracts the identification information (the building/car number ID) from the tone signal or, in other words, the identification voice signal included in an analog signal transmitted by the analog transmitting means.

The identification information (the building/car number ID) extracted by the ID extracting/converting unit 251 is sent to the monitoring terminal 210. The voice transmitting unit 252 transmits the call voice signal included in an analog signal transmitted using the analog public telephone network 400 to the telephone 230. Subsequently, the telephone 230 reproduces the call voice signal as a voice. In other words, the telephone 230 constituting reproducing means reproduces a call voice signal included in analog signal transmitted by the analog transmitting means.

The monitoring terminal 210 acquires information on an elevator 110 stored in the server 220 in association with the identification information (the building/car number ID) extracted by the ID extracting/converting unit 251 constituting identification information extracting means from the server 220 and displays the extracted information. For example, as shown in FIG. 7, the monitoring terminal 210 is provided with an input unit 212, an elevator information acquiring unit 213, and a display unit 211.

The input unit 212 is used by an observer in order to input information necessary for operating the monitoring terminal 210 and the like. Specifically, for example, the input unit 212 is an input device such as a keyboard, a mouse, and a microphone. The elevator information acquiring unit 213 first transmits the identification information (the building/car number ID) extracted by the ID extracting/converting unit 251 to the server 220.

The server control unit 222 of the server 220 retrieves the identification information (the building/car number ID) transmitted from the monitoring terminal 210 from information stored in the storage unit 221. In addition, when there is information on an elevator 110 stored in the storage unit 221 in association with the identification information (the building/car number ID), the server control unit 222 acquires the information on the elevator 110 from the storage unit 221 and sends back the acquired information to the monitoring terminal.

The display unit 211 displays information on an elevator 110 transmitted from the server 220. Specifically, for example, the display unit 211 is a monitor device constituted by a liquid crystal display (LCD).

As described above, when the telephone 230 at the information center 200 receives an emergency call using the analog public telephone network 400 from the intercom 113 inside the car of an elevator 110, a car number of the elevator 110 having made the emergency call can be specified and, at the same time, the monitoring terminal 210 at the information center 200 can be caused to display information on the elevator 110. In addition, while answering the emergency call on the telephone 230, an observer can simultaneously confirm information on the elevator 110 having made the emergency call which is displayed on the monitoring terminal 210.

Moreover, when a voice input to the intercom 113 is transmitted by VoIP from the building 100 to the information center 200 via an IP network, by sending the identification information (the building/car number ID) extracted by the ID extracting unit 242 from a header included in each packet of a digital signal to the server 220, the monitoring terminal 210 can be caused to display information on an elevator 110 specified by the identification information (the building/car number ID).

In other words, the monitoring terminal 210 is capable of acquiring information on an elevator 110 stored in the server 220 in association with identification information included in a header of a digital signal transmitted by the digital transmitting means from the server 220 and displaying the extracted information. In doing so, the building/car number ID extracted by the ID extracting unit 242 may be directly sent to the server 220 from the sorting/converting device 240 or may be sent to the server 220 via the monitoring terminal 210.

Alternatively, when a call voice signal input to the intercom 113 is transmitted with a digital signal from the building 100 to the information center 200, information on an elevator 110 provided with the intercom 113 which has been collected by the information collection device 112 may be transmitted simultaneously. In this case, the sorting/converting device 240 checks whether information on an elevator 110 is included in data transmitted by VoIP. When the information on an elevator 110 is included, the information is displayed on the monitoring terminal 210 and, at the same time, the information is also transmitted to the server 220 to have the storage unit 221 store the information.

A flow of a process performed by the information collection device 112 provided in the elevator system configured as described above when an emergency call is made will be described with reference to a flow chart shown in FIG. 8. First, in step S11, the intercom control unit 114 of the information collection device 112 checks whether or not an emergency call transmission condition is satisfied. The emergency call transmission condition is a condition set in advance. Specifically, for example, the emergency call transmission condition is a condition requiring that an emergency call button inside the car of an elevator 110 is operated. When the emergency call transmission condition is not satisfied, the flow of operations ends. On the other hand, when the emergency call transmission condition is satisfied, the flow of operations proceeds to step S12.

In step S12, the intercom control unit 114 checks whether or not the building-side sorting device 130 is in an emergency call-enabled state. When the building-side sorting device 130 is in an emergency call-enabled state, the flow of operations proceeds to step S13.

In step S13, the intercom control unit 114 starts communication of emergency call data with the building-side sorting device 130. Once step S13 is completed, the flow of the series of operations ends.

On the other hand, in step S12, when the building-side sorting device 130 is not in an emergency call-enabled state, the flow of operations proceeds to step S14. In step S14, the intercom control unit 114 waits for the building-side sorting device 130 to enter an emergency call-enabled state. In step S14, the intercom control unit 114 regularly checks whether or not the building-side sorting device 130 has entered an emergency call-enabled state. Once the building-side sorting device 130 enters an emergency call-enabled state, the flow of operations proceeds to step S13.

Next, operations of the building-side sorting device 130 provided in the elevator system configured as described above will be described with reference to flow charts shown in FIGS. 9 and 10. First, FIG. 9 shows a flow of operations for switching emergency call modes by the building-side sorting device 130. In step S21 in FIG. 9, the mode switching unit 134 of the building-side sorting device 130 checks a state of communication when using the IP network 500 based on, for example, a state of radio waves of a wireless connection from the communication device 120 to the IP network 500.

In subsequent step S22, based on the state of communication checked in step S21 when using the IP network 500, the mode switching unit 134 determines whether or not the emergency call mode is to be changed.

Specifically, for example, when the present emergency call mode is a mode which uses the IP network 500 but the state of communication using the IP network 500 is not favorable when compared with a certain standard, a determination is made to change the emergency call mode. In addition, for example, when the present emergency call mode is a mode which uses the analog public telephone network 400 and the state of communication using the IP network 500 has recovered to a favorable state when compared with the standard, a determination is made to change the emergency call mode.

When the mode switching unit 134 makes a determination to change the emergency call mode, the flow of operations proceeds to step S23. In step S23, the mode switching unit 134 switches emergency call modes. Specifically, when the present emergency call mode is a mode which uses the IP network 500 for emergency calls, the mode switching unit 134 switches the emergency call mode to a mode which uses the analog public telephone network 400. Conversely, when the present emergency call mode is a mode which uses the analog public telephone network 400 for emergency calls, the mode switching unit 134 switches the emergency call mode to a mode which uses the IP network 500.

In subsequent step S24, the mode switching unit 134 notifies the information center 200 of the change in emergency call modes made in step S23. This notification is performed by data communication via the IP network 500. Once step S24 is completed, the flow of operations proceeds to step S25. In step S25, the mode switching unit 134 waits for a certain amount of time. Subsequently, once step S25 is completed, the flow of operations returns to step S21.

On the other hand, when the mode switching unit 134 determines in step S22 not to change the emergency call mode, the flow of operations proceeds to step S25 without undergoing step S23 and step S24, and returns to step S21 after standing by for a certain amount of time.

Next, FIG. 10 shows a flow of a process performed by the building-side sorting device 130 when an emergency call is made. In step S31 in FIG. 10, the call control unit 131 of the building-side sorting device 130 checks whether or not the emergency call transmission condition described above which has been set in advance is satisfied. When the emergency call transmission condition is not satisfied, the flow of operations ends. On the other hand, when the emergency call transmission condition is satisfied, the flow of operations proceeds to step S32.

In step S32, the call control unit 131 checks the emergency call mode that is presently set. Specifically, the call control unit 131 checks whether the presently-set emergency call mode is a mode in which communication of an emergency call is performed using the IP network 500 or a mode in which communication of an emergency call is performed using the analog public telephone network 400.

In addition, in subsequent step S33, the call control unit 131 transmits an emergency call to the information center 200 in accordance with the presently-set emergency call mode. Specifically, when the presently-set emergency call mode is a mode in which communication of an emergency call is performed using the IP network 500, the digital communication control unit 133 controls the digital communication function of the communication device 120 and transmits an emergency call via the IP network 500.

On the other hand, when the presently-set emergency call mode is a mode in which communication of an emergency call is performed using the analog public telephone network 400, the analog communication control unit 132 controls the analog communication function of the communication device 120 and transmits an emergency call via the analog public telephone network 400. Once step S33 is completed, the flow of the series of operations ends.

Next, a flow of a process performed by the analyzer 250 provided in the elevator system configured as described above when an emergency call is received will be described with reference to a flow chart shown in FIG. 11. First, in step S41, when the analyzer 250 receives an emergency call via the analog public telephone network 400, in subsequent step S42, the ID extracting/converting unit 251 of the analyzer 250 analyzes a DTMF tone signal having been added to a call voice signal of the received emergency call and extracts a unique ID or, in other words, the identification information (the building/car number ID).

The flow of operations subsequently proceeds to step S43, in which the analyzer 250 checks whether or not a unique ID or, in other words, the identification information (the building/car number ID) has been extracted from the received analog signal in step S42. When a unique ID or, in other words, the identification information (the building/car number ID) has been extracted from the received analog signal, the flow of operations proceeds to step S44.

In step S44, the unique ID or, in other words, the identification information (the building/car number ID) extracted from the received analog signal is sent to the server 220. The transmission of the building/car number ID to the server 220 may be performed via the monitoring terminal 210 as described earlier or the building/car number ID may be directly transmitted from the analyzer 250 to the server 220.

When information on an elevator 110 specified by the building/car number ID received by the server 220 is stored in the storage unit 221, the server 220 having received the building/car number ID sends the information on the elevator 110 to the monitoring terminal 210. Subsequently, the monitoring terminal 210 displays information on the elevator 110 specified by the building/car number ID extracted from the received analog signal. Once step S44 is completed, the flow of operations proceeds to step S45.

In step S45, the voice transmitting unit 252 sends a call voice signal included in the received analog signal to the telephone 230. Once step S45 is completed, the flow of the series of operations ends.

On the other hand, in step S43, when a unique ID or, in other words, the identification information (the building/car number ID) has not been extracted from the received analog signal, the flow of operations proceeds to step S46. In step S46, the analyzer 250 causes the monitoring terminal 210 to display a message describing that an on-call state exists. An on-call state means that a call other than an emergency call from an elevator 110 is being received. Subsequently, once step S46 is completed, the flow of operations proceeds to step S45.

Next, a flow of a process performed by the sorting/converting device 240 provided in the elevator system configured as described above when an emergency call is received will be described with reference to a flow chart shown in FIG. 12. First, in step S51, when the sorting/converting device 240 receives an emergency call via the IP network 500, in subsequent step S52, the ID extracting unit 242 of the sorting/converting device 240 analyzes packet information of the received emergency call (VoIP) and extracts the identification information (the building/car number ID).

The flow of operations subsequently proceeds to step S53, in which the analyzer 250 checks whether or not the identification information (the building/car number ID) has been extracted from a packet of the received digital signal in step S52. When the identification information (the building/car number ID) has been extracted from a packet of the received digital signal, the flow of operations proceeds to step S54.

In step S54, the identification information (the building/car number ID) extracted from a packet of the received digital signal is sent to the server 220. The transmission of the building/car number ID to the server 220 may be performed directly from the sorting/converting device 240 to the server 220 or may be performed via the monitoring terminal 210.

When information on an elevator 110 specified by the building/car number ID received by the server 220 is stored in the storage unit 221, the server 220 having received the building/car number ID sends the information on the elevator 110 to the monitoring terminal 210. Subsequently, the monitoring terminal 210 displays information on the elevator 110 specified by the building/car number ID extracted from a packet of the received digital signal. Once step S54 is completed, the flow of operations proceeds to step S55.

In step S55, the voice converting unit 243 converts a digital call voice signal received by VoIP into an analog call voice signal. Subsequently, the sorting/converting device 240 sends the converted analog call voice signal to the telephone 230. Once step S55 is completed, the flow of the series of operations ends.

On the other hand, when the identification information (the building/car number ID) has not been extracted from a packet of the received digital signal in step S53, the flow of operations proceeds to step S56. In step S56, the sorting/converting device 240 causes the monitoring terminal 210 to display a message describing that an on-call state exists. An on-call state means that a call other than an emergency call from an elevator 110 is being received. Subsequently, once step S56 is completed, the flow of operations proceeds to step S55.

A case where a DTMF tone signal converted from a building/car number ID of an elevator 110 is used as an identification voice signal has been described above. However, as an identification voice signal, a voice signal converted from a building/car number ID by other methods can conceivably be used in addition to a DTMF tone signal. Specifically, for example, a modem (modulator-demodulator) signal converted from a building/car number ID using a modem may be used as an identification voice signal. Alternatively, a voice signal with a frequency set in advance converted from a building/car number ID using Morse code may be used as an identification voice signal. In addition, for example, a signal representing a voice simply reading out a building/car number ID may be used as an identification voice signal.

As described earlier, the information center 200 is installed in each region where a building 100 in which an elevator 110 is installed is located. In addition, in many cases, the information center 200 is basically installed in a same country as the buildings 100 in a region for which the information center 200 is responsible.

On the other hand, there may be cases where a country in which relay stations, line facilities, and the like (hereinafter, referred to as "relay stations and the like") of the analog public telephone network 400 are installed is the same country as the countries in which the information center 200 and the building 100 are located and, in other cases, the country in which the relay stations and the like are located may differ from the countries in which the information center 200 and the building 100 are located. In a similar manner, there may be cases where a country in which nodes, line facilities, and the like (hereinafter, referred to as "nodes and the like") of the IP network 500 are installed is the same country as the countries in which the information center 200 and the building 100 are located and, in other cases, the country in which the nodes and the like are located may differ from the countries in which the information center 200 and the building 100 are located. In addition, cases are conceivable where the country in which the relay stations and the like of the analog public telephone network 400 are installed is the same as the country in which the nodes and the like of the IP network 500 are installed but, at the same time, cases are conceivable where the country in which the relay stations and the like of the analog public telephone network 400 are installed differs from the country in which the nodes and the like of the IP network 500 are installed.

Furthermore, a country in which the relay stations and the like of the analog public telephone network 400 which are passed through in one communication are installed is not limited to one country and, some cases, communication may pass through relay stations and the like located in a plurality of countries. In a similar manner, a country in which the nodes and the like of the IP network 500 which are passed through in one communication are installed is not limited to one country and, some cases, communication may pass through nodes and the like located in a plurality of countries.

Therefore, for example, there may be cases where communication between the information center 200 and the building 100 located in a same country is performed via relay stations and the like of the analog public telephone network 400 installed in a country that differs from the country in which the information center 200 and the building 100 are located or cases where the communication is performed via nodes and the like of the IP network 500 installed in a country that differs from the country in which the information center 200 and the building 100 are located. In such cases, as described earlier, the country in which the relay stations, etc. or the nodes, etc. through which the communication is performed are installed may exist in plurality.

As described above, the elevator system according to the first embodiment of the present invention also assumes cases where communication between the building 100 and the information center 200 via the analog public telephone network 400 or the IP network 500 is performed across a plurality of countries.

An elevator system configured as described above includes: an intercom 113 provided inside each of cars of a plurality of elevators 110; an analog communication control unit 132 configured to add, as an identification voice signal, identification information which enables an elevator 110 in which an intercom 113 is installed to be specified, to a call voice signal input to the intercom 113; a communication device 120 configured to transmit, with an analog signal, the call voice signal to which the identification voice signal has been added; a telephone 230 configured to reproduce the call voice signal included in a transmitted analog signal; an ID extracting/converting unit 251 configured to extract identification information from the identification voice signal included in the transmitted analog signal; and a monitoring terminal 210 configured to acquire, from a server 220 configured to store information on an elevator 110 specified by the identification information in association with the identification information, information on an elevator 110 associated with the identification information extracted by the ID extracting/converting unit 251 and to display the acquired information.

Therefore, when the telephone 230 at the information center 200 receives an emergency call using the analog public telephone network 400 from the intercom 113 inside the car of an elevator 110, a car number of the elevator 110 having made the emergency call can be specified and, at the same time, the monitoring terminal 210 at the information center 200 can be caused to display information on the elevator 110. In addition, while answering the emergency call on the telephone 230, an observer can simultaneously confirm information on the elevator 110 having made the emergency call which is displayed on the monitoring terminal 210.

Furthermore, even when the telephone 230 at the information center 200 receives an emergency call by VoIP using an IP network from the intercom 113 inside the car of an elevator 110, by causing identification information to be included in a header of a digital signal, the monitoring terminal 210 can be caused to display information on the elevator 110 having made the emergency call in a similar manner to a case where an emergency call using the analog public telephone network 400 is received. Moreover, in doing so, without being conscious of whether an emergency call has been made by VoIP using an IP network or made using an analog public telephone network, an observer can confirm information on the monitoring terminal 210 and respond to the emergency call with the same convenience.

Second Embodiment

Figure 13:
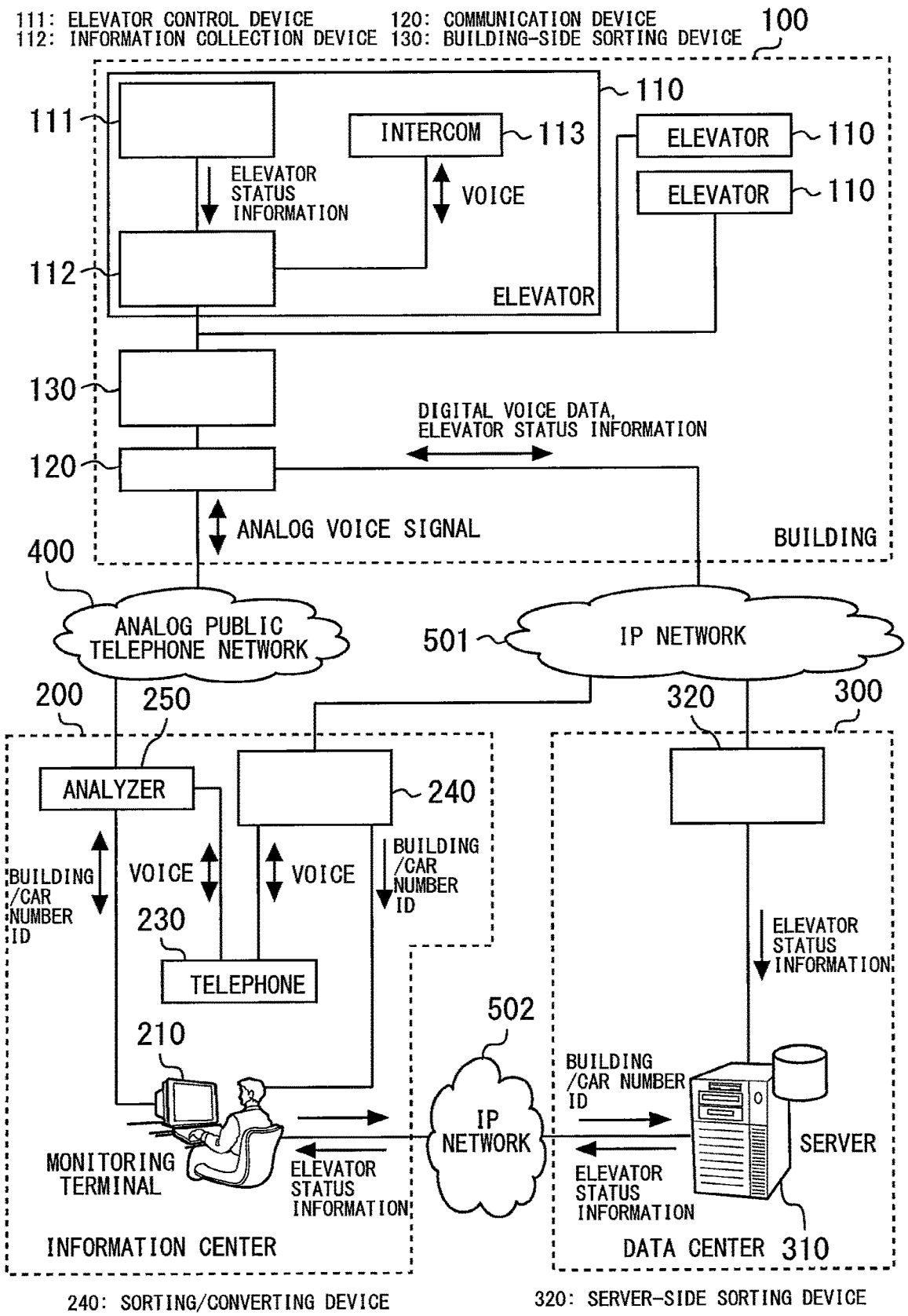
FIG. 13 is a diagram illustrating an overall configuration of an elevator system related to a second embodiment of the present invention.

FIG. 13 is a diagram illustrating an overall configuration of an elevator system according to a second embodiment of the present invention.

In the first embodiment described above, the monitoring terminal 210 and the server 220 are both installed inside the information center 200. In contrast, in the second embodiment described below, the server 220 is installed inside a data center 300 instead of inside the information center 200. Hereinafter, the elevator system according to the present second embodiment will be described with a focus on differences from the first embodiment.

As shown in FIG. 13, in the present second embodiment, the server 220 is installed inside the data center 300. For example, the data center 300 manages information necessary for maintenance and management of elevators 110 in an integrated manner across many regions. The data center 300 is provided at a location which differs from both the building 100 building and the information center 200. The monitoring terminal 210 is installed in the information center 200 in the same manner as in the first embodiment.

In the present second embodiment, the building 100 and the information center 200 are communicably connected by a first IP network 501. In addition, the data center 300 and the information center 200 are communicably connected by a second IP network 502.

A server-side sorting device 320 is installed in the data center 300. The server-side sorting device 320 is connected to the first IP network 501. The server-side sorting device 320 is provided with functions of the elevator information receiving unit 241 and the ID extracting unit 242 provided in the sorting/converting device 240 according to the first embodiment. In addition, the sorting/converting device 240 according to the present second embodiment is provided with the ID extracting unit 242 and the voice converting unit 243 but not the elevator information receiving unit 241.

Information is exchanged between the monitoring terminal 210 of the information center 200 and the server 220 of the data center 300 via the second IP network 502. Therefore, the monitoring terminal 210 is capable of acquiring information on an elevator 110 stored in the server 220 via the second IP network 502 and displaying the acquired information.

Moreover, since other configurations and operations of the respective units are similar to those of the first embodiment, detailed descriptions thereof will be omitted.

In many cases, the information center 200 is basically installed in a same country as the buildings 100 in a region for which the information center 200 is responsible in a similar manner to the first embodiment. On the other hand, for example, the data center 300 manages information necessary for maintenance and management of elevators 110 in an integrated manner across many regions as described earlier. Therefore, a country in which the data center 300 is located may differ from a country in which the information center 200 and the building 100 are located.

In addition, there may be cases where a country in which relay stations and the like of the analog public telephone network 400 are installed is the same country as any of the countries in which the data center 300, the information center 200, and the building 100 are located and, in other cases, the country in which the relay stations and the like are located may differ from any of the countries in which the data center 300, the information center 200, and the building 100 are located. In a similar manner, there may be cases where a country in which respective nodes and the like of the first IP network 501 and the second IP network 502 are installed is the same country as any of the countries in which the data center 300, the information center 200, and the building 100 are located and, in other cases, the country in which the respective nodes and the like are located may differ from any of the countries in which the data center 300, the information center 200, and the building 100 are located. In addition, cases are conceivable where the country in which the relay stations and the like of the analog public telephone network 400 are installed is the same as the country in which the respective nodes and the like of the first IP network 501 and the second IP network 502 are installed but, at the same time, cases are conceivable where the country in which the relay stations and the like of the analog public telephone network 400 are installed differs from the country in which the respective nodes and the like of the first IP network 501 and the second IP network 502 are installed.

Furthermore, a country in which the relay stations and the like of the analog public telephone network 400 which are passed through in one communication are installed is not limited to one country and, some cases, communication may pass through relay stations and the like located in a plurality of countries. In a similar manner, a country in which the nodes and the like of the first IP network 501 or the second IP network 502 which are passed through in one communication are installed is not limited to one country and, some cases, communication may pass through nodes and the like located in a plurality of countries.

Therefore, for example, there may be cases where communication between the information center 200 and the building 100 located in a same country is performed via relay stations and the like of the analog public telephone network 400 installed in a country that differs from the country in which the information center 200 and the building 100 are located or cases where the communication is performed via nodes and the like of the first IP network 501 installed in a country that differs from the country in which the information center 200 and the building 100 are located. In such cases, as described earlier, the country in which the relay stations, etc. or the nodes, etc. through which the communication is performed are installed may exist in plurality.

In addition, for example, there may be cases where communication between the building 100 and the data center 300 located in different countries is performed via relay stations and the like of the analog public telephone network 400 installed in a third country which differs from both the country in which the building 100 is located (a first country) and the country in which the data center 300 is located (a second country) or cases where the communication is performed via nodes and the like of the first IP network 501 installed in the third country. In such cases, as described earlier, the country (the third country) in which the relay stations, etc. or the nodes, etc. through which the communication is performed are installed may exist in plurality.

As described above, the elevator system according to the second embodiment of the present invention also assumes cases where communication among the building 100, the data center 300, and the information center 200 via the analog public telephone network 400, the first IP network 501, or the second IP network 502 is performed across a plurality of countries.

In an elevator system configured as described above, in addition to producing an advantageous effect similar to that produced by the first embodiment, installing the server 220 which stores information on elevators 110 at the data center 300 enables information on elevators 110 across many regions to be managed in an integrated manner.

INDUSTRIAL APPLICABILITY

The present invention can be utilized in elevator systems in which (emergency) calls are made between an intercom inside a car of an elevator installed in a building and a telephone installed at a location that differs from the building.

REFERENCE SIGNS LIST

100 Building
110 Elevator
111 Elevator control device

112 Information collection device
113 Intercom
114 Intercom control unit
115 Elevator information collecting unit
120 Communication device
130 Building-side sorting device
131 Call control unit
132 Analog communication control unit
133 Digital communication control unit
134 Mode switching unit
200 Information center
210 Monitoring terminal
211 Display unit
212 Input unit
213 Information acquiring unit
220 Server
221 Storage unit
222 Server control unit
230 Telephone
240 Sorting/converting device
241 Elevator information receiving unit
242 ID extracting unit
243 Voice converting unit
250 Analyzer
251 ID extracting/converting unit
252 Voice transmitting unit
300 Data center
320 Server-side sorting device
400 Analog public telephone network
500 IP network
501 First IP network
502 Second IP network

The invention claimed is:

1. An elevator system, comprising:
an intercom provided inside each of cars of a plurality of elevators;
identification information adding means configured to add, as an identification voice signal, identification information to a call voice signal input to the intercom, the identification information enabling the elevator in which the intercom is installed to be specified;
first transmitting means configured to transmit, with a first signal, the call voice signal to which the identification voice signal is added by the identification information adding means;
reproducing means configured to reproduce the call voice signal included in the first signal transmitted by the first transmitting means;
first identification information extracting means configured to extract the identification information from the identification voice signal included in the first signal transmitted by the first transmitting means; and
a monitoring terminal configured to acquire, from a server configured to store information on the elevator specified by the identification information in association with the identification information, information on the elevator associated with the identification information extracted by the first identification information extracting means and to display the acquired information;
second transmitting means configured to transmit a call voice signal input to the intercom with a second signal after adding, to the call voice signal, a header including identification information which enables the elevator in which the intercom is installed to be specified;
switching means configured to switch between transmitting the call voice signal input to the intercom using the first transmitting means and transmitting the call voice signal input to the intercom using the second transmitting means; and
information collecting means configured to collect information on the elevator from a control device of the elevator, wherein
the first transmitting means is configured to transmit the first signal using an analog public telephone network,
the second transmitting means is configured to transmit the second signal using an IP network,
the reproducing means is configured to be capable of reproducing the call voice signal included in the second signal transmitted by the second transmitting means,
the monitoring terminal is configured to be capable of acquiring, from the server, information on the elevator stored in the server in association with the identification information included in the header of the second signal transmitted by the second transmitting means and displaying the acquired information,
the second transmitting means is configured to transmit the information on the elevator collected by the information collecting means to the server using the IP network, and
the server is configured to store the information on the elevator transmitted using the IP network.

2. The elevator system according to claim 1, wherein the monitoring terminal and the server are installed in an information center provided at a location that differs from a building in which the elevator is installed.

3. The elevator system according to claim 1, wherein
the monitoring terminal is installed in an information center provided at a location that differs from a building in which the elevator is installed, and
the server is installed in a data center provided at a location that differs from both the building and the information center.

4. The elevator system according to claim 1, further comprising
second identification information extracting means configured to extract the identification information from the header included in the second signal transmitted by the second transmitting means, wherein
the monitoring terminal is configured to be capable of acquiring, from the server, information on the elevator stored in the server in association with the identification information extracted by the second identification information extracting means and displaying the acquired information.

5. An elevator system, comprising:
reproducing means configured to be capable of reproducing a call voice signal included in a first signal transmitted via an analog public telephone network and the call voice signal included in a second signal transmitted via an IP network;
first identification information extracting means configured to extract an identification information from an identification voice signal included in the first signal transmitted via the analog public telephone network;
second identification information extracting means configured to extract the identification information from a header included in the second signal transmitted via the IP network; and
a monitoring terminal configured to acquire, from a server configured to store information on an elevator specified by the identification information in association with the identification information, information on the elevator associated with the identification information and to display the acquired information, wherein the first signal is a signal that identification information is added, as an identification voice signal, to a call voice signal input to an intercom, the intercom provided inside each of cars of a plurality of the elevators, the identification information enabling the elevator in which the intercom is installed to be specified, the second signal is a signal that the header is added to the call voice signal input to the intercom, the header including the identification information enabling the elevator in which the intercom is installed to be specified, the server is configured to store the information on the elevator transmitted using the IP network, and the monitoring terminal is configured to:

be capable of acquiring, from the server, information on the elevator stored in the server in association with the identification information extracted by the first identification information extracting means and displaying the acquired information, and be capable of acquiring, from the server, information on the elevator stored in the server in association with the identification information extracted by the second identification information extracting means and displaying the acquired information.

* * * * *